Feb. 26, 1952 R. R. CROOKSTON 2,587,444
FLUID CONTROL SYSTEM
Filed May 13, 1948 4 Sheets-Sheet 1
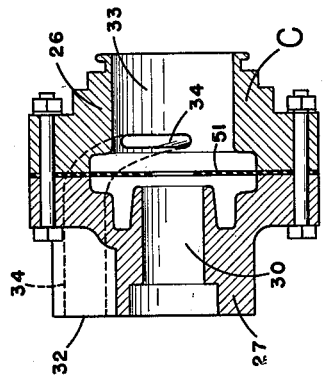
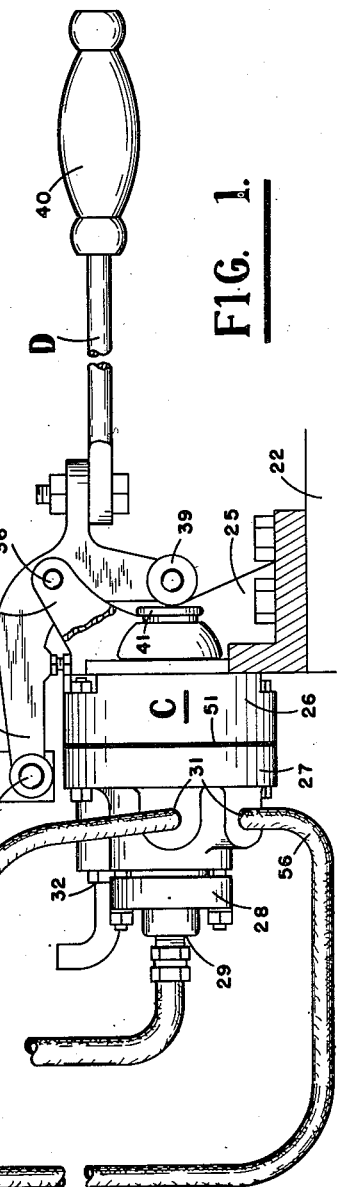
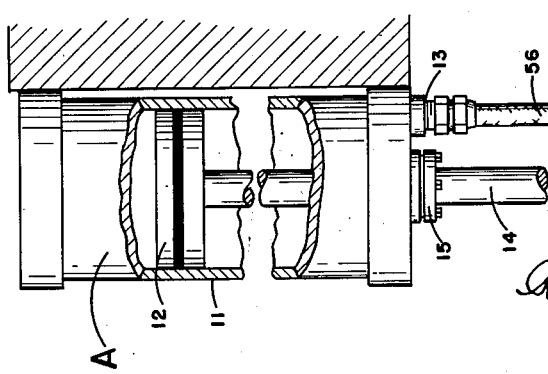
Robert R. Crookston, INVENTOR.
BY
J.S. McKean
ATTORNEY.

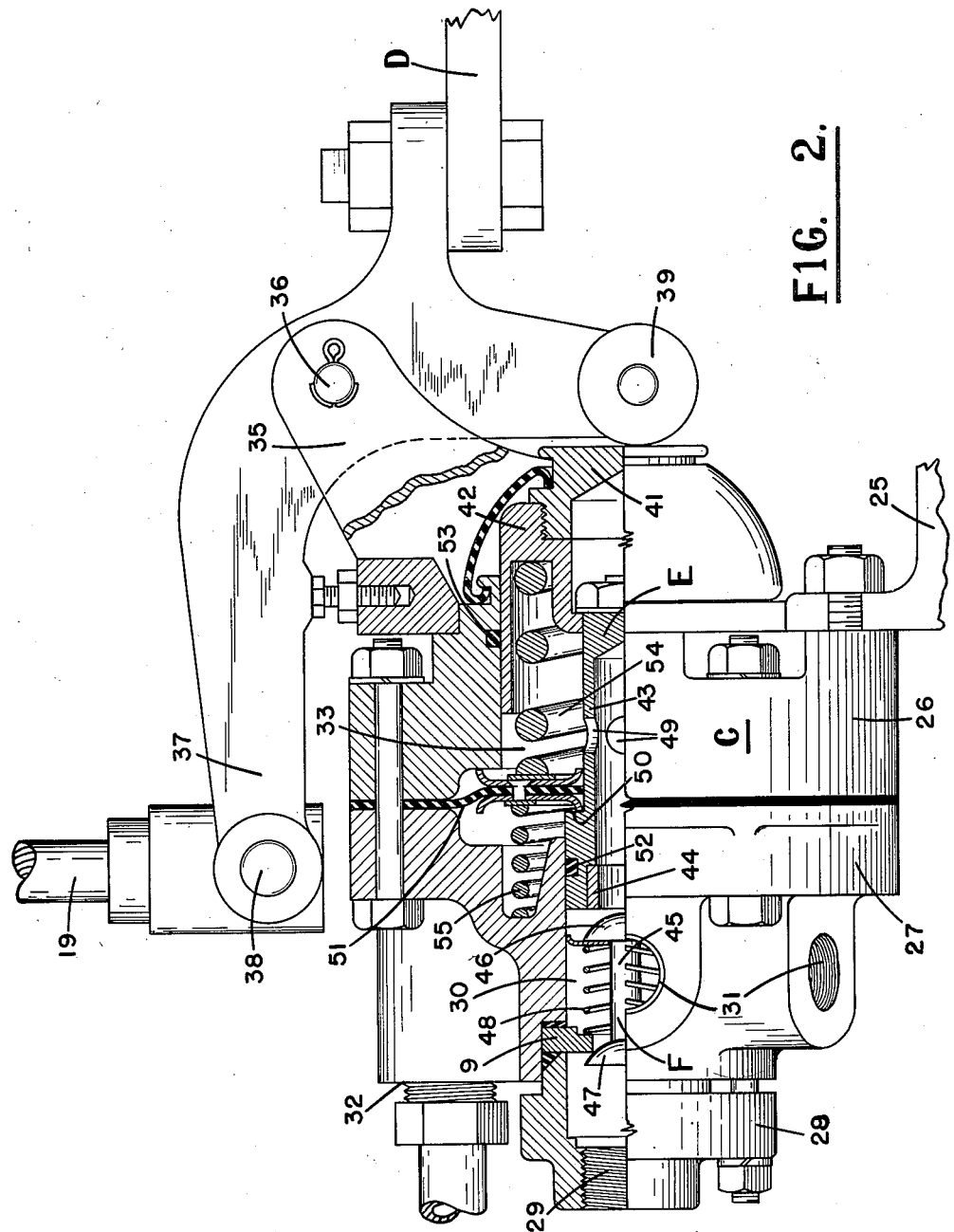

Robert R. Crookston, INVENTOR.

BY
J.S. McJan
ATTORNEY.

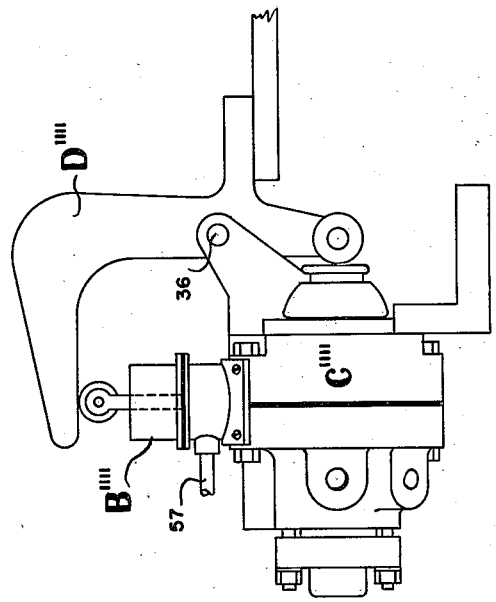
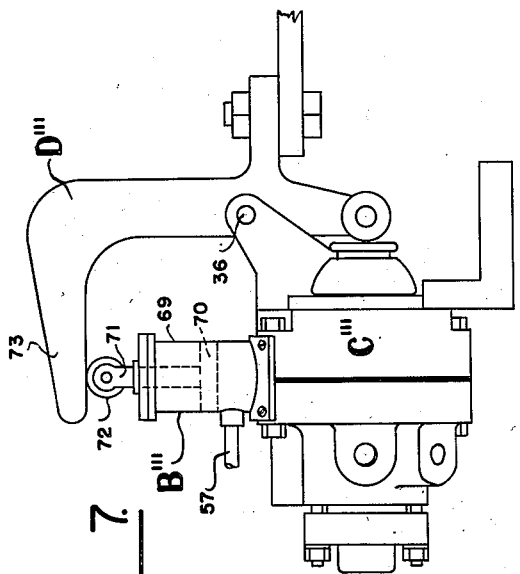

Patented Feb. 26, 1952

2,587,444

UNITED STATES PATENT OFFICE 2,587,444

FLUID CONTROL SYSTEM

Robert R. Crookston, Houston, Tex., assignor, by mesne assignments, to Standard Oil Development Company, Elizabeth, N. J., a corporation of Delaware Application May 13, 1948, Serial No. 26,842

6 Claims. (Cl. 303—54)

1

The present invention is directed to a fluid control system and particularly to a means adapted to control the application of fluid pressures as in a fluid activated brake system.

Brake valves for controlling air brakes on trains, trucks, and busses and for numerous other applications, including actuation of clutches and other oil field machinery component parts, are in reality combination regulating and relief valves. Their mechanical make-up is of such nature that they deliver pressures approximately proportional to their handle or foot lever positions. If, in a typical or bus application, the operator depresses the foot pedal further more air pressure is released and greater braking effort is thus attained. If he raises the pedal slightly some of the air is bled out and a lessened braking effort results. If he holds the brake pedal in any one position and the pressure is inclined to drop by reason of leakage, then the valve attempts to make up for the leak anyway. If the pedal is held in a fixed position and a temperature increase causes the air pressure to go up, then the valve tends to bleed the excess off.

Most commercial brake valves in use even until the present time have fine and accurate air control characteristics, among other reasons, because unbalanced seat areas are kept small. Most have been easy to operate by reason of the fact that total areas involved are small, said feature being important because it makes possible the use of smaller diaphragms and smaller bucking or regulating springs.

One defect common to all commercial valves of the foregoing characteristics has been and is their inability to deliver but very small quantities of air. For air brake service in trains, busses, trucks, and the like, the brake valves have been and are used mostly to energize "relay" or "quick application" valves which, upon signal from the brake valves, take air from its source, deliver it in large quantities to the brake cylinders, and relieve it as required.

The relatively small capacities of such brake valves, combined with the fact that two pieces of apparatus instead of one have been employed, has brought about a hysteresis or delayed action in braking performance. What this actually means is that the brake is applied some fraction of a second or possibly seconds after the operator makes up his mind to do so and is released only after a similar time lapse after the operator has made up his mind to "let the brakes off."

This phenomena causes air brakes to be extremely "rough" when handled by other than experienced operators. Most of us do not appreciate this roughness when riding passenger vehicles because operators are individually trained before being turned loose on their own.

The saving feature so far as air brakes on trains, busses, trucks, and the like, are concerned is that, because the operator is riding the vehicle that he is braking, he "feels" the timing and response of the air brakes. It is this required sense of "feel" that brought about the necessity of doing something in connection with the brake performance when applying air brakes to rotary drilling rigs used for drilling deep boreholes.

On rotary drilling rigs which for the most part have employed self-energizing hand brakes, the operators learned or realized a sense of "feel" from the brake handles themselves, since no sensation of acceleration and deceleration by riding as a passenger is present.

It is an object of the present invention to provide a brake system applicable to fluid actuated brakes which gives a characteristic signal through the activating lever which will enable the operator to determine whether the brakes are being properly applied or released.

It is another object of the present invention to provide a means whereby the pressure applied to a given system is utilized to assist in operating control means controlling the flow of fluid to said system.

Other objects and advantages of the present invention will be seen from the following description taken in conjunction with the drawing in which:

Fig. 1 is an elevation, partly in section, showing an embodiment of the present invention;

Fig. 2 is a view of a portion of the assembly of Fig. 1 with parts cut away to show details of construction;

Fig. 3 is a view, partly in section, showing details of construction of the valve body of Figs. 1 and 2;

Fig. 7 is a fragmentary view showing another arrangment which may be substituted for a portion of the assembly of Fig. 1; and Fig. 8 is still another arrangement which may be substituted for a portion of the assembly of Fig. 1.

Figure 4:
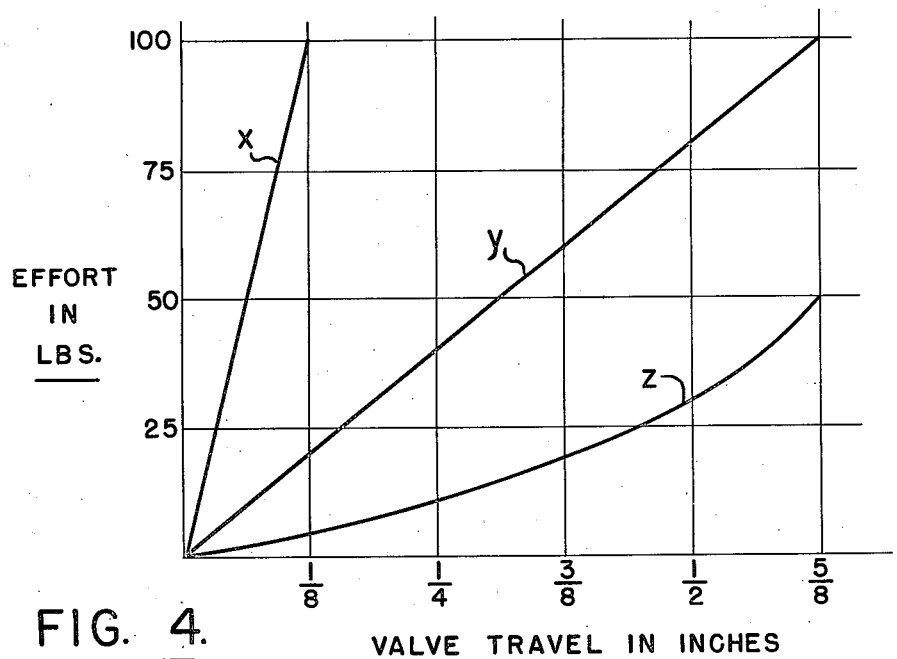
Fig. 4 is in the form of a series of curves showing the force required to operate the valve element shown in Figs. 1 and 2 when employing the complete embodiment of the present invention, that required when using a mechanical advantage and that required when no mechanical advantage is used.

In considering the drawing, it is to be observed that for convenience letters are used to designate assemblies and principal elements and numbers are used to designate parts of assemblies and principal elements.

Turning now specifically to the drawing and first to the embodiment illustrated in Figs. 1, 2 and 3, a system for controlling the flow of a power fluid and for utilizing the power fluid is shown. This system consists of a power chamber assembly A, a booster chamber assembly B, a valve having a valve body C, and an actuating lever arm D for controlling the position of a movable valve assembly in the valve body. The movable valve assembly consists of parts E and F. The lever arm D is pivoted for movement about a center fixed with respect to the valve body and is mechanically linked to a movable portion of a booster chamber assembly B.

Power chamber assembly A is shown for illustrative purposes as consisting of a cylinder 11 with a piston 12 slidably arranged therein. The piston end of the cylinder defines an inlet port 13. A piston rod 14 is connected to the piston and passes through a suitable packing gland 15 to project through the headend of the cylinder. It will be apparent that the piston rod may be arranged to activate any suitable member, such as a brake band, but in order to simplify the drawing, a showing of a specific element to be activated has been omitted. As explained heretofore, the power chamber assembly A is shown as a cylinder and piston assembly for illustrative purposes, other arrangements, such as a diaphragm, are well known to the art as fully equivalent to a cylinder and piston assembly.

Booster chamber assembly B consists of cylinder 16 with a piston 17 slidably arranged therein. The headend of the cylinder defines an inlet port 18. A piston rod 19 is attached to piston 17 and passes through packing gland 20 to extend through the headend of cylinder 16. The piston end of the cylinder 16 defines equalizing ports 21 and is secured to frame 22 by bolt 23 which has a head 24 defining an arcuate surface cooperating with corresponding surfaces of the piston end of cylinder 16 so that the cylinder may pivot on bolt head 24.

Valve body C consists of members 25, 26, 27, and 28 which are bolted together to form a unit. Member 28 defines an air inlet port 29. Member 27 defines a central passage 30 in communication with delivery ports 31; it also defines an exhaust port 32. Ring 9 between parts 27 and 28 serves as the seat for the intake valve, part 26 defines a central passage 33 which may be considered a continuation of central passage 30 of part 27, as well as passage 34 which fluidly connects said central passage 33 with exhaust port 32. The upper portion of part 25 defines projections or fork 35 which are provided with passages for receiving pin 36. The lower portion of part 25 is bolted to frame 22 so that the body C will remain in a fixed position.

Activating lever arm D is bifurcated with one end 37 pivoted to piston rod 19 of booster chamber assembly B by pin 38 and the other end 39 adapted to control the position of the movable valve assembly within the valve body C. Between ends 37 and 39 the lever arm D is provided with a laterally extending passage through which pin 36 extends. Pin 36 serves as a fixed center about which lever arm D may pivot. Lever arm D defines a handle 40 adapted to be grasped by the operator.

The movable valve assembly consists of the separable parts E and F.

Part E consists of cap 41, cylindrical member 42, cylindrical member 43 and ring 44. Cap 41 is secured to member 42 by screw threads, and member 43 is bolted to member 42. Ring 44 is the seat for the exhaust valve element and fits snugly into a recess defined by member 43 and may be retained in position by friction contact.

Part F consists of a central body 45 with an exhaust valve element 46 secured to one end and intake valve element 47 secured to the other end. A spring 48 is arranged about body 45 to bias intake valve element 47 against ring 9 which serves as the intake valve seat.

In the part E member 43 defines side ports 49 and an outside ledge 50. A diaphragm 51 in the form of an annulus has its outer periphery extending between members 26 and 27 of valve body C and its inner boundary in snug slidable engagement with the outer surface of member 43 to form a fluid tight seal between the central passages 30 and 33 defined by members 27 and 26, respectively, of valve body C. A fluid tight seal between the outer surface of member 43 and the surface of member 27 defining passage 30 is maintained by packing 52. Similarly, a fluid tight seal between the outer surface of member 42 and the surface of member 26 defining central passage 33 is provided by packing 53.

A heavy coil spring 54 is arranged outside member 43 with one end in contact with diaphragm 51 and the other end in contact with member 42 of movable valve part E. A somewhat lighter coil spring 55 is arranged outside member 43 with one end in contact with diaphragm 51 and the other end in contact with member 27 of valve body C.

Conduit 56 fluidly connects a delivery port 31 with inlet port 13 of power chamber assembly A. Conduit 57 fluidly connects a delivery port 31 with inlet port 18 of booster chamber assembly B.

When the activating lever arm is released by the operator it will assume the position shown in Fig. 1 and the movable valve parts E and F similarly will be in the position shown. With the parts in this position, intake valve element 47 is in contact with ring 9 which defines its seat, so that air cannot enter the valve body from inlet port 29. Exhaust valve element 46 is separated from the ring 44 which serves as its seat so that air is free to pass from delivery port 31 through passages defined by the valve body to exhaust port 32.

If, from this position, the operator moves activating lever arm D downward it will force movable valve part E toward part F until ring 44, which serves as the exhaust valve seat, contacts exhaust valve element 46. With the parts in this position, the exhaust port as well as the inlet port is cut off from communication with delivery ports 31. However, additional downward movement of operating lever arm D will maintain the exhaust valve closed while forcing intake valve element 47 away from its seat 9 so that the air inlet port 29 is in communication with delivery ports 31 and air may flow from the inlet port through the valve to the delivery ports and thence to power chamber assembly A and booster chamber assembly B.

If the operator wishes to close the valve, the movements described in the preceding paragraph are reversed. That is, the operator allows activating lever arm D to move upward which in turn allows parts E and F of the movable valve assembly to move together under the influence of spring 48, springs 54 and 55, and unbalanced pressure areas. The parts E and F move together until intake valve element 47 contacts its seat defined by ring 9; at this point no air can enter the valve through inlet 29, and as exhaust valve element is seated on its seat defined by ring 44, no air can pass from the valve body to exhaust port 32. Upon additional upward movement of lever arm D, no further movement of part F is possible but part E may continue to move; this separates the seat defined by ring 44 from exhaust valve element 46 and allows air to pass from delivery port 31 through the valve body to exhaust port 32. The limit of movement of parts E and F when exhausting air is shown by the position of the several parts in Fig. 2.

The arrangement of parts E and F with diaphragm 51 and springs 48, 54, and 55 is such that the valve delivers pressures approximately proportional to the position of activating lever arm D. If the operator depresses lever arm D sufficiently to force intake valve element away from its seat, air is fed into the delivery outlets until a given pressure builds up in passage 30 where it is exerted against the end of cylindrical member 43 of movable valve part E. This pressure assists springs 45 and 55 in overcoming the bias exerted by spring 54 and allows intake valve element to contact its seat when this pressure has built up. If the lever arm D is held in this given position, and pressure at the delivery ports 31 drops because of leakage, the force exerted by this pressure plus springs 45 and 55 is not sufficient to balance the force of spring 54 so that inlet valve element 47 is forced away from its seat and allows air to enter from inlet 29 until the given pressure is again built up. If, when the operating lever arm is held in this given position, the pressure becomes greater than the equilibrium pressure, as by an increase in temperature in power chamber A, this pressure exerted on the end of member 43 plus the bias of spring 55, overcomes spring 54, and forces ring 44 away from exhaust valve element so that the excess pressure is bled off, at which time the exhaust valve element is again seated. If the operator moves the operating lever arm D down still more additional air enters the valve body until a new and greater equilibrium pressure is reached; if he moves arm D upwardly air is bled out through exhaust port 32 until a new and lesser equilibrium pressure is reached.

Now, in the operation of the system of the present invention, the admittance of air to booster chamber assembly B from a delivery port 31 enables the air pressure which is applied to power chamber assembly A to assist the operator in the operation of the valve assembly. The design of the valve shown in Figs. 1, 2 and 3 permits a large volume of compressed air to be handled by the valve, but it also involves the exposure of relatively large areas to unbalanced fluid pressure so that the arrangement of booster chamber assembly B which assists the operator in opening the valve greatly increases the range of usefulness of the valve. In other words, a mere mechanical lever arm arranged to move elements E and F requires the operator to exert too much physical force, or move the arm through too great a distance for efficient operations.

The volume of the power chamber assembly A and conduit 56 connecting it to delivery port 31 should be a multiple of the volume of booster chamber assembly B and conduit 57 connecting it to a delivery port 31. This difference in volumes allows the pressure in booster chamber assembly B to reach equilibrium conditions sooner than the pressure in power chamber assembly A after the valve has been operated. If the operator moves the activating lever arm D faster than it should be moved for smooth application of fluid pressure to or release of fluid pressure from the power chamber assembly A, a characteristic movement which acts as a signal to the operator will be given to operating lever arm D.

This characteristic movement results because the pressure transmitted through parts F and E of the movable valve element to end 39 of handle D corresponds to the pressure in power chamber assembly A and lags behind the pressure change in booster chamber assembly B which pressure is transmitted to end 37 of handle D.

The embodiment of Figs. 1, 2 and 3 has an additional advantage that as the operating lever arm D travels through its stroke, its effective lever arm is reduced so that it assists the operator's hands less in proportion. This is illustrated by the curves in Fig. 4 in which the ordinate represents the distance of valve travel in inches when opening a specific valve and the abscissa represents the effort required in pounds. In this figure curve X represents the amount of force which must be directly applied to the valve in order to operate it. Curve Y represents the force required to operate the valve element if the valve were provided with a handle giving a 5 to 1 mechanical advantage. Curve Z illustrates the force required to operate the same valve when provided with a booster corresponding to booster chamber assembly B and an operating lever arm corresponding to arm D of Fig. 1.

It will be obvious that various modifications of the booster assembly and the operating lever arm may be made and advantages of the present invention retained.

Figure 5:
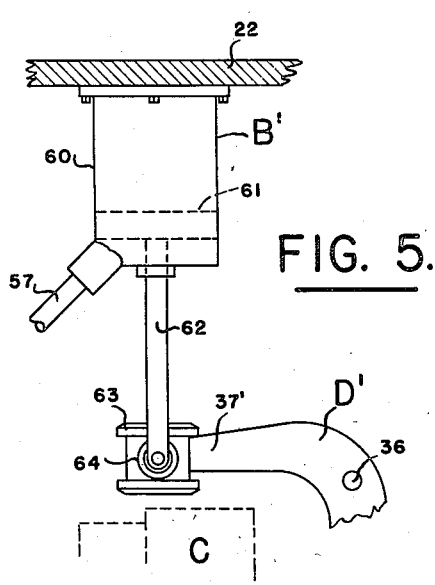
Fig. 5 is a fragmentary view of an arrangement which may be substituted for a portion of the assembly of Fig. 1.

Fig. 5 is a fragmentary view of another embodiment of a booster cylinder for activating lever arm D. In this embodiment booster chamber B' consists of a cylinder 60 firmly mounted on frame 22. A piston 61 is slidably mounted in the piston with a piston rod 62 secured thereto. The piston rod end of cylinder 60 defines an inlet port to which is connected conduit 57 for supplying power fluid thereto in the same manner as in the embodiment of Figs. 1 to 3. The actuating lever arm is designated as D' inasmuch as it is slightly different from the activating lever D of the embodiment of Figs. 1 to 3. Activating lever arm D' is pivoted on transversely extending pin 36. The portion adapted to be grasped by the operator and the portion adapted to be contacted with the movable valve member may be identical with like parts of the activating lever D and in order to simplify the drawing have not been shown in this figure.

However, the end corresponding to end 37 has been designated as end 37' and is provided with a cross head 63 arranged to cooperate with a roller 64 secured to the end of piston rod 62. In the embodiment of this invention, the piston moves along a fixed axis while the operating lever arm pivots around pin 36 in the operation of the valve. In this embodiment the principal advantages of the embodiment of Figs. 1 to 3 are obtained, namely, the booster cylinder aids in operating the movable valve members E and F and a jerk which acts as a signal is transmitted to activating handle D' when the activating handle is not operated in such a way as to apply or release the brake smoothly.

Figure 6:
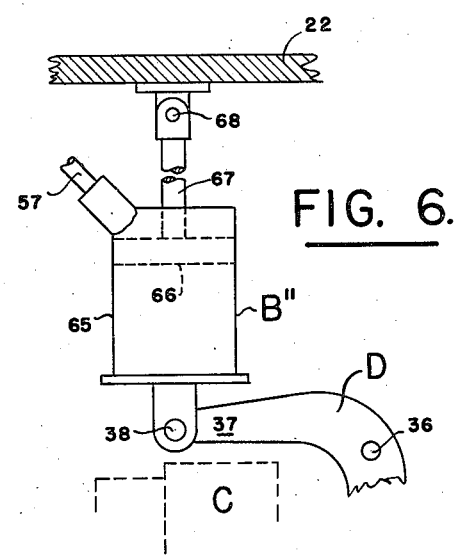
Fig. 6 is a fragmentary view showing another arrangement which may be substituted for a portion of the assembly of Fig. 1.

Another embodiment of the present invention is shown in the fragmentary view of Fig. 6. This embodiment is similar to that of Figs. 1 and 3 with the position of the cylinder and piston reversed. The activating lever arm used in this embodiment may be identical with that of the embodiment shown in Figs. 1 to 3 and, accordingly, has been designated with identical letter D. In this embodiment a booster chamber assembly B'' consists of a cylinder 65 with a piston 66 slidably mounted therein and connected to a piston rod 67. The cylinder is connected to end 37 of actuating lever arm D by means of pin 38. The piston rod is secured through pin 68 to frame 22. The piston rod end of cylinder 67 defines an inlet to which is connected conduit 57 for admitting pressure fluid in the same manner as in the embodiment of Figs. 1 to 3.

Still another embodiment of the present invention is shown by the fragmentary view of Fig. 7. In this embodiment a booster chamber assembly B''' is mounted on valve body C'''. It will be understood that the construction of the valve members within body C''' may be identical with that of the preceding embodiments but the body is given a different reference letter inasmuch as it is arranged to have the booster cylinder B''' mounted directly thereon. Activating lever arm D''' is arranged for arcuate movement about laterally extending pin 36 with respect to valve body C'''. Booster cylinder B''' consists of a cylinder 69 with a piston 70 slidably mounted thereon. The head end of the cylinder defines a port for connection with a conduit 57 which is connected with valve body in the like manner as in the precedingly described embodiments. Piston rod 71 has one end secured to piston 70 and the other end carries a roller 72 adapted to make friction contact with end 73 of activating lever arm D'''. It will be obvious that the booster chamber assembly B''' differs from the booster chamber assemblies B'' and B''' previously described in that it is arranged to push the end of the activating lever arm whereas the precedingly described booster chamber assemblies pull the activating lever arm when operator is closing the valve. However, this embodiment will produce satisfactory results in assisting the operator in closing the valve and in giving the operator a signal if the valve is not operated in such a way as to apply or release the pressure fluid in the same manner in the precedingly described valve assemblies.

Another embodiment of the present invention is shown in Fig. 8. In this embodiment valve body C'''' has a booster chamber assembly B'''' mounted thereon. This booster chamber assembly has a diaphragm 74 mounted therein and defines an inlet port connected through conduit 57 to the valve body C in identically the same manner as in the precedingly described embodiments. The activating lever arm D'''' is adapted to be pivoted about pin 36. The embodiment of Fig. 8 is similar to Fig. 7 in that the booster chamber assembly pushes the activating lever handle upwardly when the operator is moving the actuating lever arm D'''' to close the valve. This embodiment has the same advantages that power fluid from the valve body aids in operating the valve itself and also in giving the operator a signal in the form of a jerk if the power fluid is not applied to or released from power cylinder A in such a manner as to produce smooth operation.

While several embodiments of the device of the present invention have been shown and described, it is to be emphasized that the same relative volume ratios must be maintained between the ports of the system in each embodiment. The comparative volumes of the system including the power chamber assembly A and the conduit connecting it to a delivery inlet 31 of the valve and the volume of the conduit connecting a delivery inlet to the booster chamber assembly B is preferably of the order of 25:1. However, it is to be understood that this ratio may be varied over a substantial range and satisfactory results will be obtained.

In the system of the present application, it is essential that the volume of the power chamber assembly A with the conduit connecting it to a delivery port 31 be a multiple of the volume of the booster chamber assembly B with the conduit connecting it with a delivery port. Generally speaking, the greater the multiple the more satisfactory the system will be. As a specific example, it has been found that a ratio between the two areas of the order of 25:1 gives satisfactory results. However, the ratio between the two areas must be maintained within reasonable limits. It is believed, for example, that if the ratio were to be made as great as 100:1 the effect of the booster chamber assembly in comparison with the power chamber assembly would be so small as to be insignificant and the system would not take full advantage of the phenomena utilized in the system of the present application.

When applying the system described to air brakes the air pressure between the delivery inlet port of the valve body and the brake cylinder tends to be equalized upon applying or releasing the brakes. However, the air pressure at this point is fluidly connected to the booster cylinder B so that the volume of the booster cylinder B with its connecting conduit is substantially less than the volume of the brake cylinder with the conduit. Because of this volumetric relationship the air pressure exerted through the piston of the booster B to the hand lever produces a signal which is received by the operator prior to the time the brake cylinder assumes a new equilibrium position after movement of the valve. In effect, when applying the brakes the booster cylinder gives the handle a jerk in one direction if the brakes are applied too quickly for smooth operation and when releasing the brakes gives the handle a jerk in the opposite direction if the brakes are released too rapidly for smooth operation.

The feature of the invention is that the lever arm is arranged so that the pressure transmitted to the brake cylinder is applied against one portion of the lever system of the actuating lever arm while the force applied by the booster system is mechanically connected to another portion of the actuating lever arm. As long as the forces are applied substantially uniformly to these two points the movement of the actuating lever arm will tend to be merely a uniform motion but when the pressures are applied at different times (which may result by applying or releasing the brakes too rapidly) the pressure builds up in the actuating cylinder more rapidly than it builds up in the valve body and this produces the characteristic jerk on the actuating handle heretofore mentioned.

The nature and objects of the present invention having been completely described and illustrated, what I wish to claim as new and useful and to secure by Letters Patent is:

1. A control system comprising, in combination, a valve assembly having a valve body defining an inlet port and at least one delivery port, a valve element carried by said body and movable to control flow of fluid between the inlet port and delivery port, means defining a separate booster chamber spatially removed from said valve body of variable capacity with at least one portion substantially fixed with respect to the valve body and at least one portion movable with respect to the valve body, means defining a separate power chamber of variable capacity spatially removed from said valve body, a conduit fluidly connecting a delivery port with the booster chamber, a conduit fluidly connecting a delivery port with the power chamber, the volume of the power chamber and conduit connecting it to the delivery port being a multiple of the volume of the booster chamber and conduit connecting it to the delivery port, and an actuating lever arm pivoted about a center fixed with respect to said valve body arranged for controlling the position of said movable valve element and in mechanical communication at all times with said movable portion of the means defining the booster chamber.

2. A device in accordance with claim 1 in which said means defining a chamber of variable capacity is a cylinder with a piston slidably mounted therein and said piston is mechanically linked to said actuating lever arm.

3. A device in accordance with claim 1 in which said means defining a chamber of variable capacity is a diaphragm and in which one wall of the diaphragm is mechanically connected to said actuating lever arm.

4. A system in accordance with claim 1 in which the mechanical advantage of the lever arm applied to the movable element of the valve remains substantially constant and the mechanical advantage of the lever arm applied to said piston diminishes upon movement of the lever arm from an initial position to a second position.

5. A device in accordance with claim 1 in which the piston is attached to the lever arm by a linkage having a mechanical advantage over the point of application of force from the lever arm to the valve element which diminishes upon movement of the lever arm from a first to a second position.

6. A control system in accordance with claim 1 in which the ratio of the volume of the power chamber and conduit connecting it to the delivery port to the volume of the booster chamber and conduit connecting it to the delivery port is approximately 25 to 1.

ROBERT R. CROOKSTON.

REFERENCES CITED

The following references are of record in the file of this patent:

UNITED STATES PATENTS

| Number | Name | Date |
| --- | --- | --- |
| 2,379,692 | Dodson | July 3, 1945 |